(12) United States Patent
Cinotti

(10) Patent No.: US 9,091,486 B2
(45) Date of Patent: Jul. 28, 2015

(54) PRESSURIZED-WATER-COOLED NUCLEAR REACTOR WITH COMPACT STEAM GENERATORS

(75) Inventor: Luciano Cinotti, Recco (IT)

(73) Assignee: DEL NOVA VIS S.R.L (IT)

( * ) Notice: Subject to any disclaimer, the term of this patent is extended or adjusted under 35 U.S.C. 154(b) by 1435 days.

(21) Appl. No.: 12/674,362

(22) PCT Filed: Aug. 21, 2008

(86) PCT No.: PCT/IB2008/002174
§ 371 (c)(1),
(2), (4) Date: Jun. 13, 2011

(87) PCT Pub. No.: WO2009/024856
PCT Pub. Date: Feb. 26, 2009

(65) Prior Publication Data
US 2012/0275558 A1     Nov. 1, 2012

(30) Foreign Application Priority Data

Aug. 22, 2007   (IT) .............................. MI2007A1686

(51) Int. Cl.

| G21C 15/00 | (2006.01) |
| G21C 1/32 | (2006.01) |
| F28D 7/04 | (2006.01) |
| F22B 21/28 | (2006.01) |
| F22B 1/16 | (2006.01) |
| F22B 37/12 | (2006.01) |
| F28F 9/013 | (2006.01) |
| F28F 9/02 | (2006.01) |
| F28F 27/02 | (2006.01) |
| G21D 1/00 | (2006.01) |

(52) U.S. Cl.
CPC . *F28D 7/04* (2013.01); *F22B 1/162* (2013.01);
*F22B 21/28* (2013.01); *F22B 37/12* (2013.01);
*F28F 9/013* (2013.01); *F28F 9/0246*
(2013.01); *F28F 27/02* (2013.01); *G21C 1/322*
(2013.01); *G21D 1/006* (2013.01); *G21Y*
*2002/30* (2013.01); *G21Y 2004/30* (2013.01);
*G21Y 2004/301* (2013.01); *Y02E 30/40*
(2013.01)

(58) Field of Classification Search
CPC .......... G21C 3/32; G21C 3/322; G21C 3/326;
F22B 21/28
USPC .......... 376/406; 60/641.1–641.11; 122/235.22
See application file for complete search history.

(56) References Cited

U.S. PATENT DOCUMENTS

| 3,305,450 A | * | 2/1967 | Maldague Pierre | .......... 376/307 |
| 3,840,051 A | * | 10/1974 | Akashi et al. | .................... 138/37 |
| 4,072,563 A | * | 2/1978 | McDonald et al. | ........... 376/406 |
| 4,182,413 A | | 1/1980 | Kissinger | |

(Continued)

FOREIGN PATENT DOCUMENTS

| EP | 0527354 | 2/1993 |
| GB | 723217 | 2/1955 |

*Primary Examiner* — Jack W Keith
*Assistant Examiner* — Sharon M Davis
(74) *Attorney, Agent, or Firm* — The Belles Group, P.C.

(57) ABSTRACT

A nuclear reactor cooled with pressurized water, having a pressurized tank installed in which are compact steam generators; each steam generator comprises a plurality of heat-exchange tubes having respective spiral portions set in levels on top of one another to form at least one annular tube bundle delimiting a substantially cylindrical internal central zone, pre-arranged for supply from above with primary water, which then traverses the tube bundle radially.

21 Claims, 8 Drawing Sheets

(56) References Cited

U.S. PATENT DOCUMENTS

| | | | |
|---|---|---|---|
| 4,284,134 A | 8/1981 | Harris | |
| 4,285,396 A * | 8/1981 | Schwoerer et al. | 165/162 |
| 4,431,028 A * | 2/1984 | Hendrick | 137/625.3 |
| 4,653,172 A * | 3/1987 | Hackley | 29/525.08 |

* cited by examiner

PRESSURIZED-WATER-COOLED NUCLEAR REACTOR WITH COMPACT STEAM GENERATORS

CROSS-REFERENCE TO RELATED PATENT APPLICATIONS

The present application is a U.S. national stage application under 35 U.S.C. §371 of PCT Application No. PCT/IB2008/002174, filed Aug. 21, 2008, which claims priority to Italian Application No. MI2007A001686, filed Aug. 22, 2007, the entireties of which are incorporated herein by reference.

TECHNICAL FIELD

The present invention relates to a nuclear reactor, in particular a pressurized-water-cooled nuclear reactor, equipped with one or more steam generators of a compact type.

In particular, the present invention relates to a pressurized-water-cooled nuclear reactor, in which the primary heat exchangers are steam generators, where the heat produced in the core is transferred by means of a first process fluid, constituted by pressurized water (primary water), to a second process fluid, constituted by boiling water (secondary water) kept at a pressure lower than that of the primary water, and are installed within the pressurized tank containing the core of the reactor, namely in the space that, with the components of the reactor contained therein, is referred to as "primary system".

BACKGROUND ART

Known reactors of this type are equipped with primary heat exchangers with heat-exchange tubes of various conformations, for example, helical tubes, straight tubes, and U-shaped tubes, all of which present various drawbacks, above all in terms of overall dimensions and of fluid-dynamic and heat-exchange effectiveness.

In particular, helical-tube heat exchangers are relatively complex and costly to produce, and the tubes, albeit presenting an excellent capacity for absorbing the thermal gradients linked to their operation, require a particularly complex supporting system that can be damaged by the fluid-induced vibrations. Furthermore, to reduce the pressure losses of the primary fluid that circulates in transverse flow on the outside of the tubes, from the top down, it is necessary to limit the velocity thereof by spacing the tubes out a lot, with consequent increase in the dimensions of the heat exchanger.

DISCLOSURE OF THE INVENTION

An aim of the present invention is to provide a pressurized-water-cooled nuclear reactor that will overcome the drawbacks of the known solutions that have been highlighted and will present constructional advantages and advantages from a safety standpoint.

The present invention hence relates to a pressurized-water-cooled nuclear reactor, as defined in the annexed claim 1 and, as regards its auxiliary characteristics and plant configurations, in the dependent claims.

BRIEF DESCRIPTION OF THE DRAWINGS

The invention is described in the following non-limiting example of embodiment, with reference to the figures of the annexed drawings, wherein.

BEST MODE FOR CARRYING OUT THE INVENTION

Figure 1:
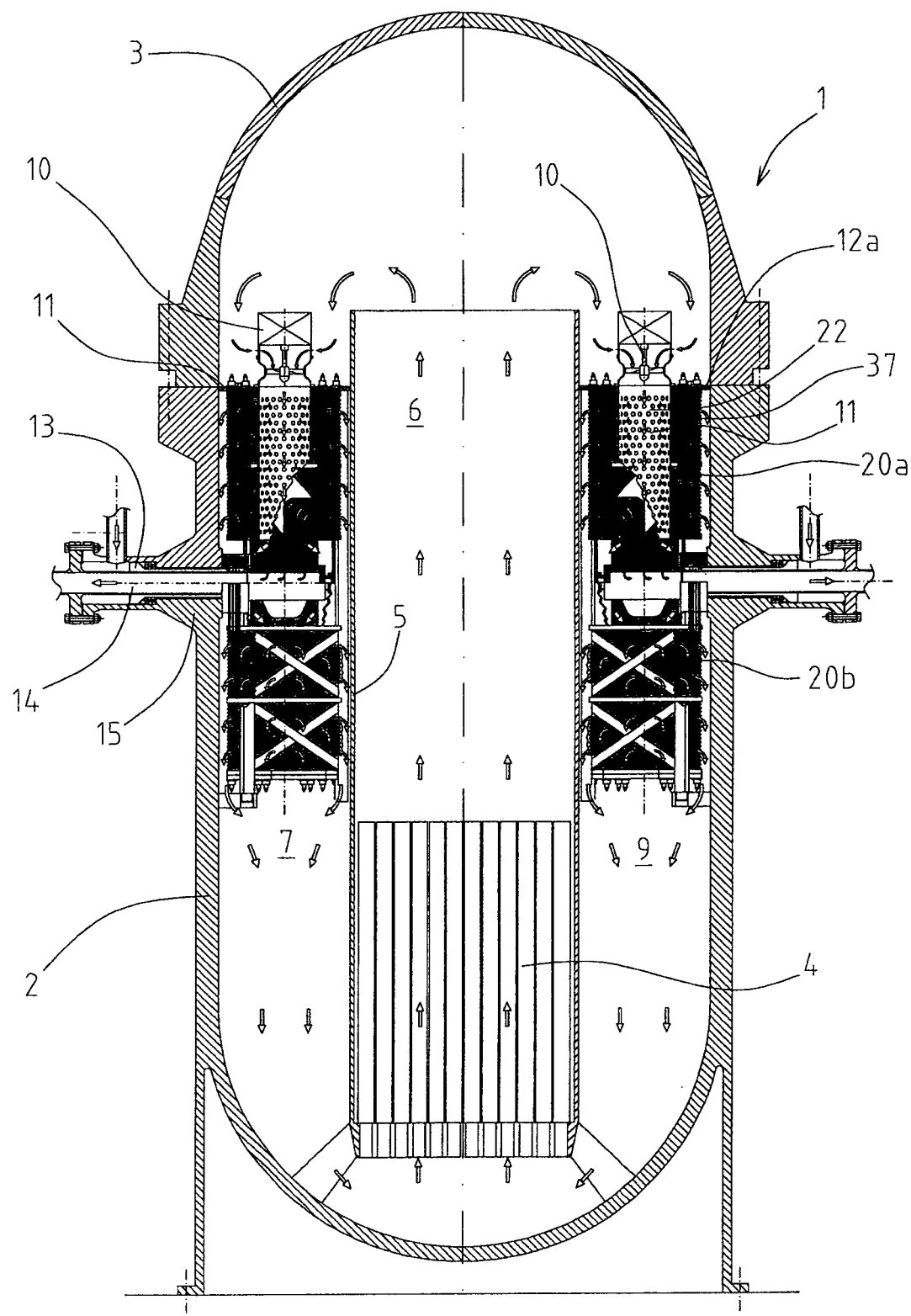
FIG. 1 is a partial schematic view in longitudinal section of a nuclear reactor in accordance with the invention.
Figure 2:
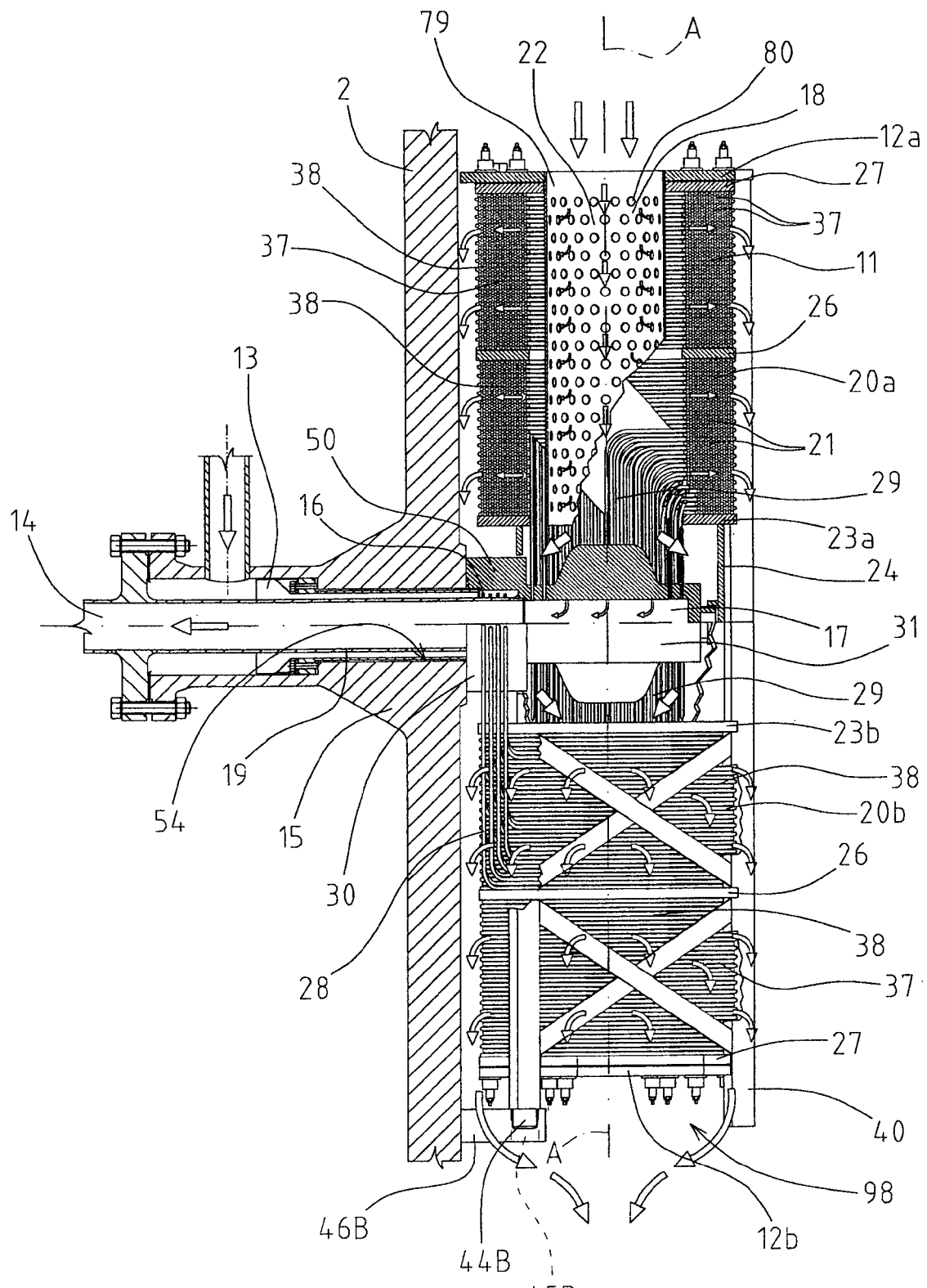
FIGS. 2 and 3 are two views in elevation orthogonal to one another, with parts in longitudinal section and parts removed for reasons of clarity, of a steam generator installed in the reactor of FIG. 1.
Figure 3:
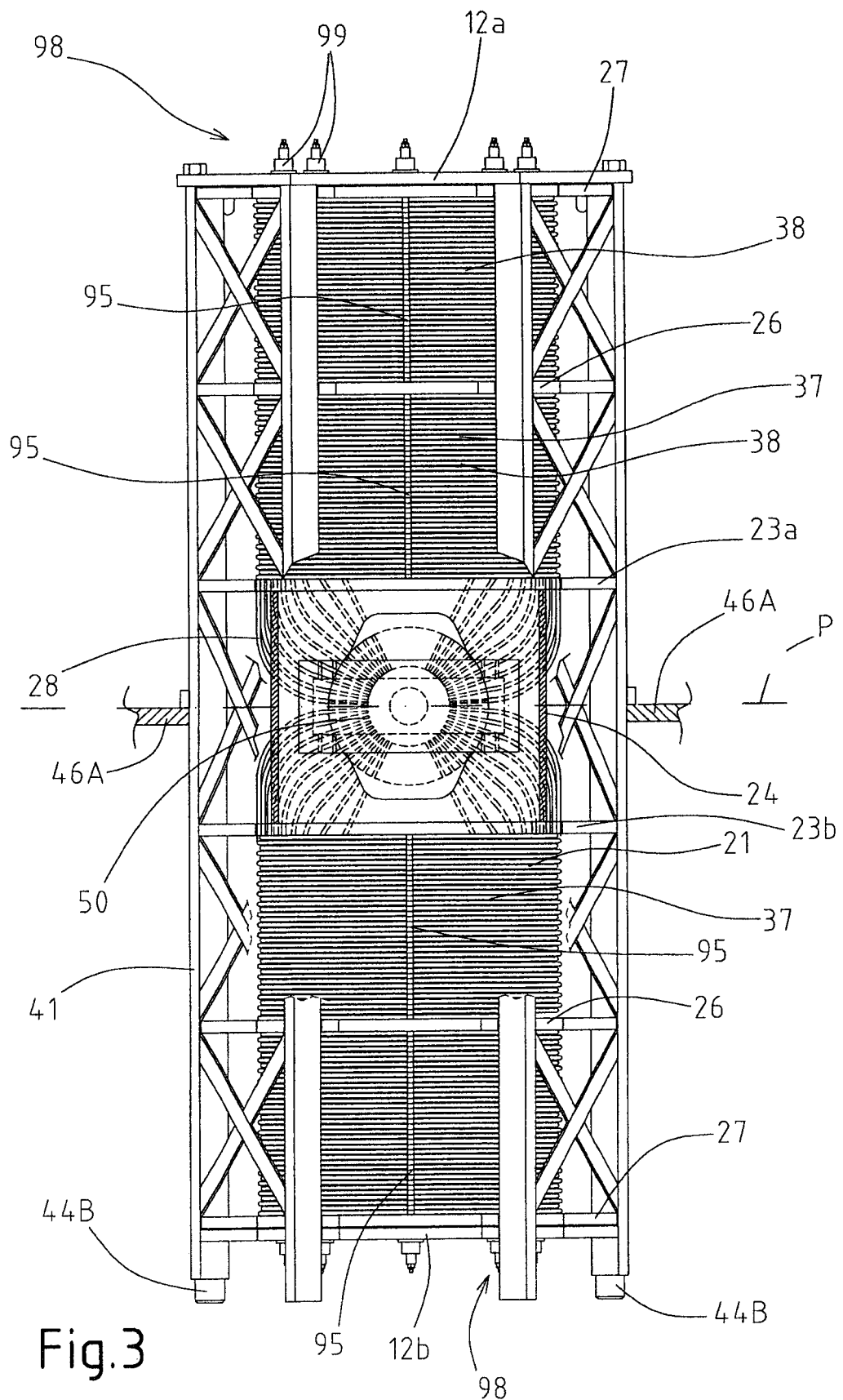

With reference to FIG. 1, a pressurized-water-cooled nuclear reactor 1 comprises a pressurized main tank 2 closed at the top by a lid 3. The tank 2 contains within it a core 4 and a hydraulic separation structure 5, which delimits a hot header 6 and a cold header 7, in which primary cooling water 8 circulates for cooling the core 4. The cold header 7 is defined by an annular region 9 comprised between the tank 2 and the structure 5 and is consequently set around the hot header 6.

Housed within the tank 2 are pumps 10 for circulation of the primary water, and steam generators 11, which are traversed by the primary water and transfer to secondary cooling water (boiling within the steam generators 11), circulating in an external secondary circuit (which is known and is not illustrated), the power generated in the core 4.

The steam generators 11 are arranged entirely in the cold header 7 and are circumferentially spaced around the structure 5. In the forced-circulation solution, the pumps 10, which are of the water-immersed type, are set in the hot header 6, on top of and aligned with respective steam generators 11. In the natural-circulation solutions, the pumps 10 are absent.

Housed within the structure 5 are various auxiliary devices, amongst which, for example, machines for transfer of the fuel, structures for supporting the instrumentation, control rods, etc., not described for reasons of simplicity in so far they are known and are not relevant to the present invention.

With reference also to FIGS. 2-5, each steam generator 11 extends substantially along a vertical axis A and has a water-inlet duct 13 and a steam-outlet duct 14, which are located in a position corresponding to a nozzle 15 so that they pass through said nozzle, the nozzle being made in a side wall of the tank 2. The ducts 13, 14 are hydraulically connected, respectively, to a water-delivery manifold 16 and to a steam-return manifold 17, which are set in a central area of the steam generator 11.

The steam generator 11 comprises a plurality of heat-exchange tubes 21, in which secondary water circulates and which are individually connected, via respective opposite ends, to the manifolds 16, 17. The steam generator 11 is of the type where the fluid boils inside the heat-exchange tubes 21.

Each tube 21 comprises a substantially plane spiral portion 37 wound about the axis A, a delivery branch 28 that connects a radially external end of the portion 37 to the manifold 16, and a return branch 29 that connects a radially internal end of the portion 37 to the manifold 17.

By "spiral portion" is meant a portion having a basically spiral shape or a close to spiral shape, which is wound on itself and about a central axis (axis A) and which has a single plane of lie.

Each spiral portion 37 is constituted by a plurality of substantially concentric turns set inside one another about the axis A, which lie substantially in a common plane perpendicular to the axis A. The spiral portions 37 are set on top of one another in a number of levels to form at least one substantially annular tube bundle 20 delimiting a substantially cylindrical central zone 22 that houses a primary supply duct 18 in which the pressurized primary water coming from the hot header 6 flows from the top downwards.

On each level there can be set the spiral portion 37 of just one tube 21, or else on each level there can be set the spiral portions 37 of two or more tubes 21, the turns of the different tubes 21 of the level being inserted (concatenated) in one another and lying in a common plane so that the n-th turn of one tube will be followed by the n-th turn of the next tube, and so forth.

In the example illustrated, the steam generator 11 has a top tube bundle 20a and a bottom tube bundle 20b, which are located, respectively, on top and underneath the manifolds 16, 17 and the nozzle 15. Each tube bundle 20 can comprise spiral portions 37 wound all in the same direction or else, as in the example shown, groups of spiral portions 37 having opposite directions (left and right), which define respective sections 38 of tube bundle separated by plates 26.

The delivery branches 28 extend in a prevalently vertical direction substantially parallel to the axis A and are set circumferentially alongside one another and are radially external to the tube bundles 20. The branches 28 are connected via respective appropriately shaped opposite end stretches to the manifold 16 and to the radially external ends of the spiral portions 37, respectively.

The return branches 29 extend substantially parallel to the axis A and in a prevalently vertical direction, and are set circumferentially alongside one another and radially inside the tube bundles 20. The branches 29 are connected to the manifold 17 and to respective radially internal ends of the spiral portions 37.

The steam generator 11 comprises a supporting structure 40 releasably connected to the wall of the tank 2. In particular, the supporting structure 40 comprises: a top terminal plate 12a and a bottom terminal plate 12b, set at respective axially opposite ends of the steam generator 11; a pair of intermediate plates 23a, 23b, which delimit, together with the plates 12a, 12b, the tube bundles 20a, 20b; and a lattice frame 41 rigidly connected to the plates 12, 23 via fixed rigid connections 43 and formed by uprights 35 substantially parallel to the axis A and by stiffening beams 36.

The supporting structure 40 is supported vertically by the tank 2 and constrained axially to the tank 2 substantially at the height of a horizontal middle plane P, perpendicular to the axis A, of the nozzle 15, via pins 44A, which are carried by the supporting structure 40, are substantially parallel to the axis A, and engage respective seats 45A formed on brackets 46A (FIGS. 3, 5) that project from the internal surface of the tank 2. Further brackets 46B, provided with seats 45B engaged by pins 44B carried by the supporting structure 40 (FIGS. 2, 5), have prevalently the function of guiding and containing transversely the supporting structure 40 and hence the steam generator 11.

The steam generators 11 are arranged circumferentially alongside one another in such a way as to be set between the hot header 6 and the cold header 7 and to intercept the entire flow of primary water flowing between the hot header 6 and the cold header 7. In particular, the plates 12a are perforated for enabling inlet of the primary water inside the steam generators 11 and are shaped and set alongside one another to constitute a substantially annular horizontal hydraulic separation structure between the hot header 6 and the cold header 7.

The manifolds 16, 17 are hydraulically separate but are located inside a single manifold body 50 connected to a single nozzle 15.

The manifold body 50 is partially housed in a substantially cylindrical casing 24, which hydraulically connects the zones of the tube bundles 20 and is fixed, via further fixed rigid connections 43, to the frame 41. The manifold body 50 comprises a tubular inlet portion 30 adjacent and consecutive to a hollow terminal portion 31 with closed bottom. A dismantleable tubular element 19 is inserted in the tubular portion 30 for defining an annular space that constitutes the water-delivery manifold 16. The steam-return manifold 17 is made inside the terminal portion 31. The tubular element 19 delimits inside the steam-outlet duct 14, and extends through the nozzle 15 to define on the outside an annular duct 62 constituting the water-inlet duct 13. The branches 28 that supply the tube bundles 20a and 20b branch off from respective opposite sides of the tubular portion 30 of the manifold body 50. The branches 29 coming from the tube bundles 20a and 20b are connected to opposite faces (facing respective tube bundles 20) of the terminal portion 31 of the manifold body 50.

The manifold body 50 is supported at opposite ends by the casing 24, via the tubular portion 30 inserted in a precise way and so that it is free to slide in a hole made on a front wall of the casing 24 and via a pin 51 carried by the manifold body 50 diametrally opposite to the tubular portion 30 and inserted in a seat 52 carried by the casing 24.

Figure 6A:
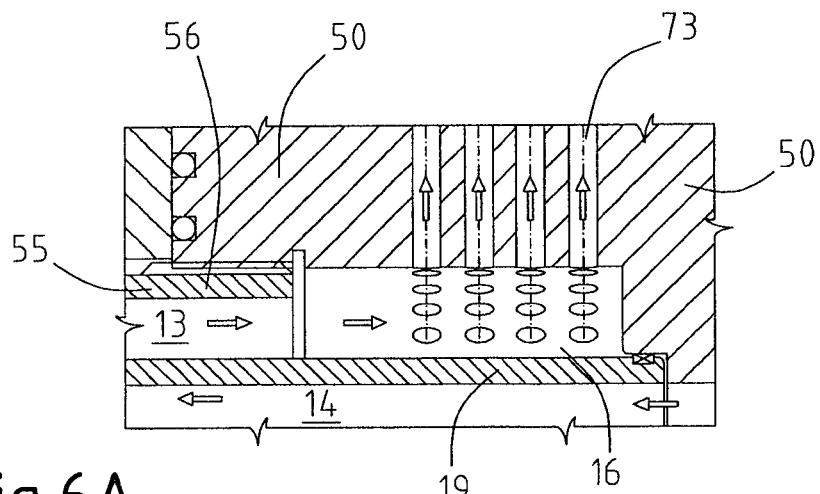
FIG. 6A shows a detail at an enlarged scale of the steam generator of FIG. 4.

With reference also to FIG. 6A, the nozzle 15 has a radial through opening 54 in the wall of the tank 2 and a portion 53 external to the tank 2, set inside which are the ducts 13, 14, which are fitted laterally on the manifold body 50. The duct is set substantially coaxial inside the duct 13. The manifold body 50 is joined to the nozzle 15 in a releasable and fluidtight way via a gripping element 55 having a tubular stretch 56 set through the opening 54 of the nozzle 15 and a flange 57. The stretch 56 is fixed, for example screwed, to a free end of the tubular portion of the manifold body 50, and the flange 57 co-operates with an opposed shoulder 59 formed on the wall of the tank 2. Adjustment elements 60 are screwed within respective threaded holes made through the flange 57 and bear upon the shoulder 59 for enabling a uniform circumferential distribution of the gripping force between the manifold body 50 and the nozzle 15. Metal gaskets 61 (which are known) are set between the manifold body 50 and the nozzle 15.

Figure 4:
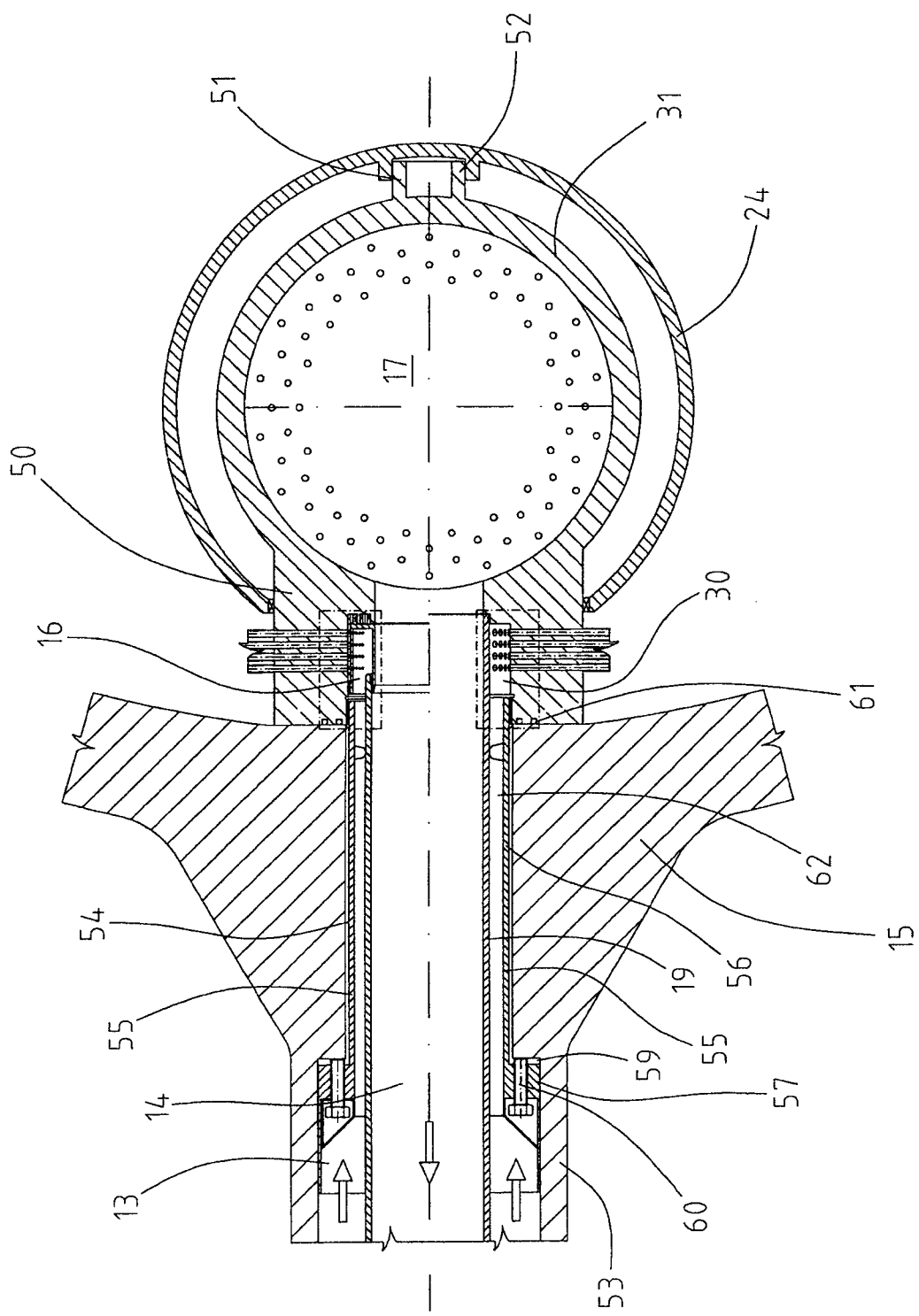
FIG. 4 is a partial schematic cross-sectional view, according to a median plane, of the steam generator of FIGS. 2-3, where shown in respective dashed boxes are two variants of a constructional detail.
Figure 5:
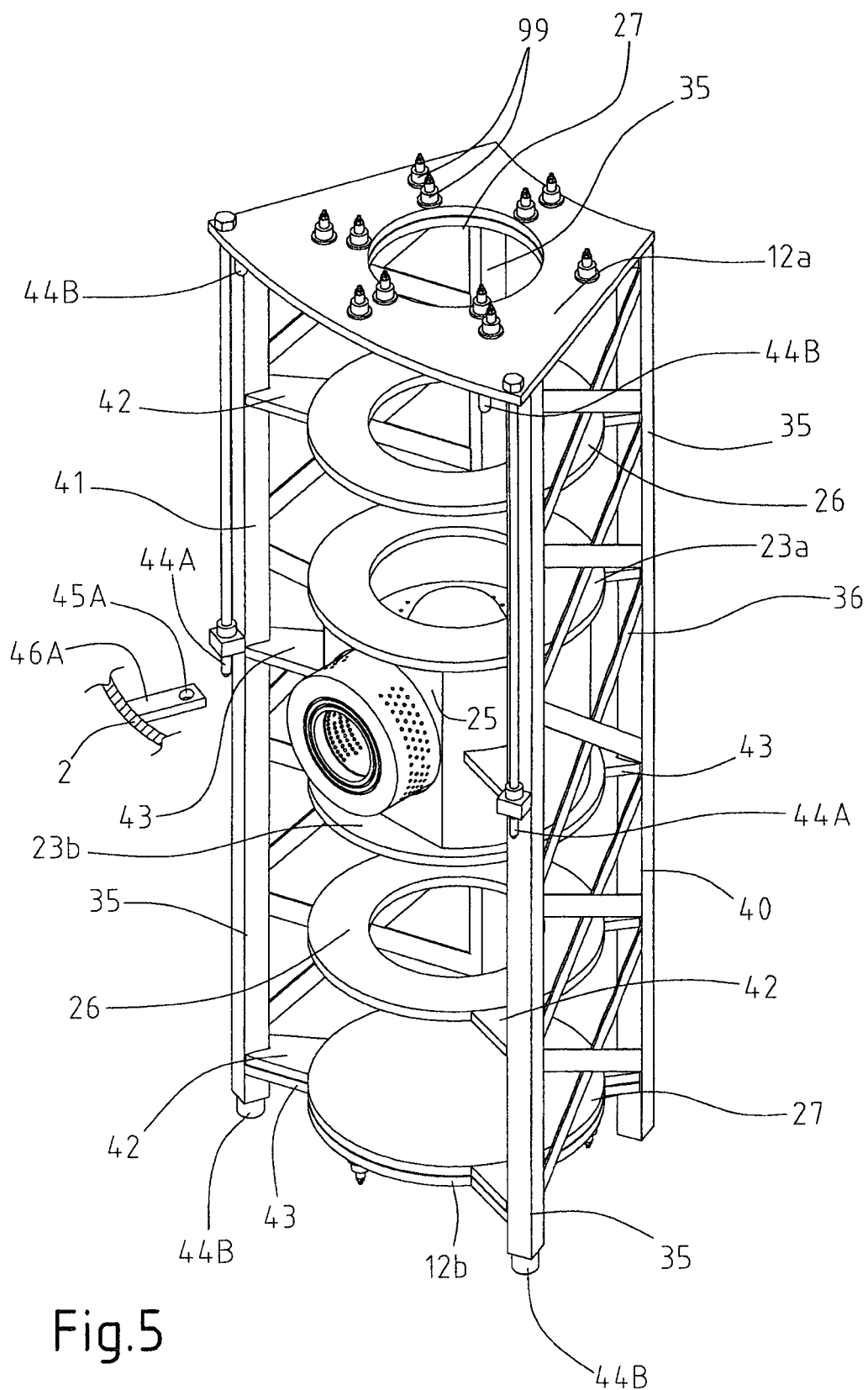
FIG. 5 is a perspective view, with parts removed for reasons of clarity, of a supporting body and a manifold body of the steam generator of FIGS. 2-3.
Figure 6B:
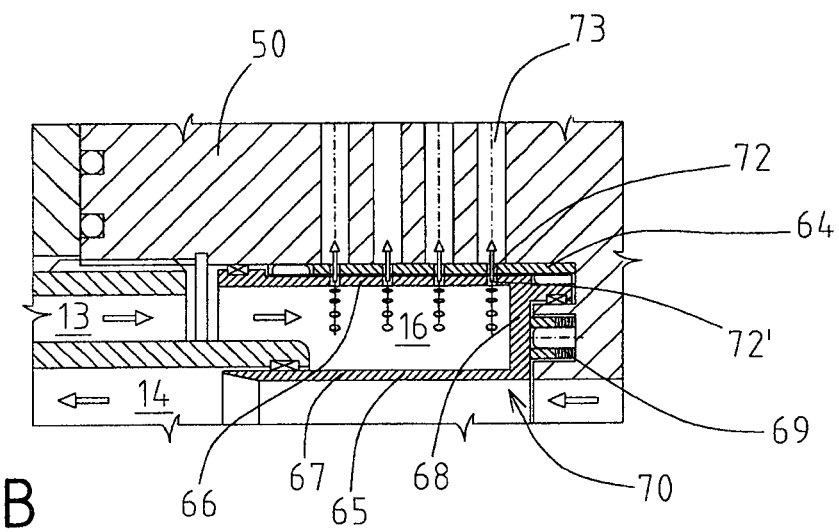
FIGS. 6B and 6C show the detail of FIG. 6A according to a constructional variant, in respective operating configurations.
Figure 6C:
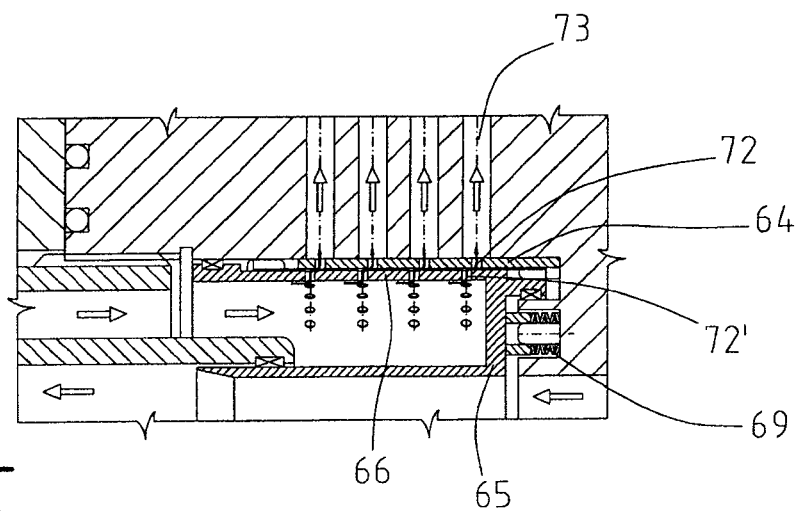

According to the variant shown in the top dashed box of FIG. 4 and in FIGS. 6B, 6C, the water-delivery manifold 16 is provided with a (self-regulating) pressure-loss regulation device 70 for adjustment of the local pressure losses that are located at inlet to the tubes 21.

In the example shown, the device 70 comprises a pressure loss generator element 64 set inside the water-delivery manifold 16, which is substantially cylindrical and is provided with small calibrated holes 72 facing and aligned with respective mouths 73 of the heat-exchange tubes. The holes 72 have a diameter smaller than that of the mouths 73 so as to determine a pre-set pressure loss located at inlet to each heat-exchange tube and stabilize boiling in the heat-exchange tubes in parallel.

An axisymmetrical mobile element 65 is housed within the element 64 and axially slidable therein, with calibrated play, with respect to the element 64, and is constituted, for example, by two coaxial cylindrical walls 66, 67 and by a closed connection bottom 68 between the walls 66 and 67. The radially external wall 66 faces the element 64 and is provided with small calibrated holes 72' facing the holes 72. Acting on the bottom 68 are pusher elements 69 for varying the position of the mobile element 65 with respect to the element 64 between a position of alignment, in which the holes 72 are substantially aligned with the holes 72', and a staggered position, in which the holes 72 are staggered with respect to the holes 72'. More precisely, the holes 72, 72' are aligned when the steam generator 11 operates at full power and are instead staggered when, with a low water flowrate, the difference in pressure between the water-delivery manifold 16 and the steam-outlet manifold 17, that acts on the opposite faces of the bottom 68, is no longer sufficient to counter the action of the pusher elements 69.

Set within the tube bundles 20 are respective substantially cylindrical ferrules 79 provided with calibrated holes 80 and mechanically connected to the supporting structure 40. The ferrules 79 delimit inside the supply ducts 18.

Figure 7:
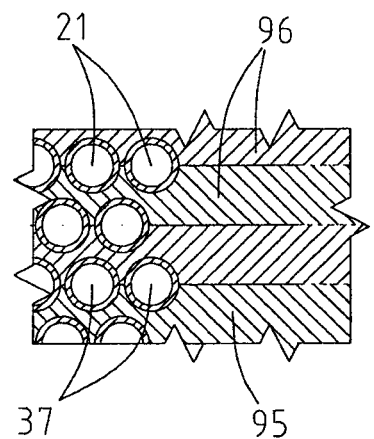
FIGS. 7 and 8 are, respectively, a view in longitudinal section and a perspective view of further details of the steam generator of FIGS. 2-3.
Figure 8:
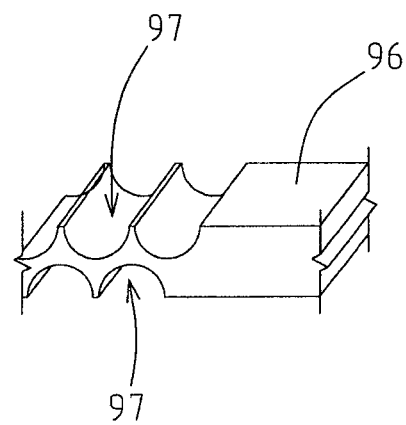
Figure 9:
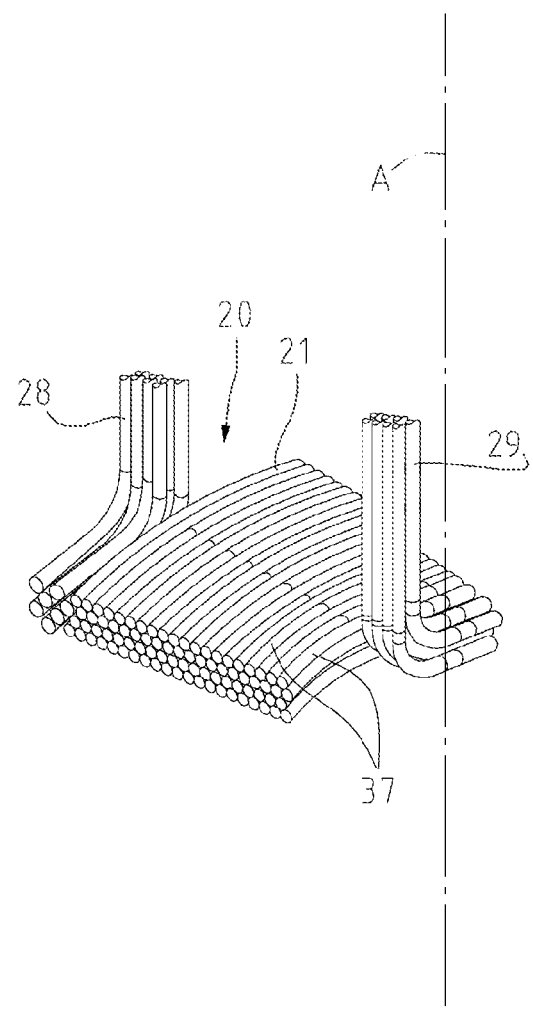
FIG. 9 is a perspective view of a detail of the tube bundle at an enlarged scale.

The spiral portions 37 are rigidly supported in a plurality of circumferential positions via respective column supports 95 (only one of which is shown schematically in FIG. 3), which project radially with respect to the axis A and are angularly spaced from one another. As is shown in detail in FIGS. 7-8, each support 95 comprises a plurality of radial bars 96 set on top of one another to form a column support 95, which extends vertically substantially throughout the height of a tube bundle 20 or of a section 38 of tube bundle. Each bar 96 is set between the spiral portions 37 set at two consecutive levels and has two sets of saddle-shaped seats 97, which are set on opposite faces of the bar 96 and house the spiral portions 37 set at consecutive levels.

Each tube bundle 20 is associated to an adjustable mechanical pre-compression system 98. The spiral portions 37 of the tube bundle 20 are packed tight and compressed by pre-tensioned elastic pusher elements 99, set circumferentially spaced about the axis A on the plates 12 (fixed to the supporting structure 40) and acting, via mobile pressure plates 26, 27 parallel to the axis A (i.e., vertically) with respect to the supporting structure 40, on the spiral portions 37 and/or on the supports 95 for gripping the tube bundle 20 axially (vertically). For example, each pusher element 99 comprises a spring pack and an external-thread/internal-thread adjustment screw pair (known and not illustrated for simplicity).

Provided in the example shown are terminal pressure plates 27, set at respective axial ends of each tube bundle 20 opposite to the fixed plates 12, and intermediate pressure plates 26, set between the sections 38 of each tube bundle 20. The plates 26, 27 are guided by the uprights 35 via respective appendages 42.

In use, under normal conditions of operation of the reactor 1, the primary water coming out of the core 4 rises vertically in the hot header 6, flows radially beyond the structure 5 at the level of the lid 3, and penetrates vertically through the openings of the plates 12a in the central zones 22 of the steam generators 11, which it traverses from the top downwards. In each steam generator 11, the primary water circulates in the primary supply duct 18 of the top tube bundle 20a. Part of the primary water traverses the top tube bundle 20a radially, and part reaches, through the casing 24, the central supply duct 18 of the bottom tube bundle 20b, from which it traverses the tube bundle 20b radially. The supply ducts 18 delimited by the ferrules 79 with the holes 80 constitute conveying means for conveying the primary water through the steam generator 11 in such a way that the primary water will traverse the tube bundles 20 substantially radially. The secondary water circulates inside the tubes 21 from the radially external end to the radially internal end of each spiral portion 37. The primary water, after traversing the tube bundles 20 radially, flows then vertically on the outside of the tube bundles 20 in the cold header 7 and returns to the core 4.

From the foregoing there emerge clearly the advantages of the present invention, as summed up below.

The spiral shape of the heat-exchange tubes 21 presents the same advantages as the helical shape as regards absorption of any thermal expansion.

The adoption of tube bundles 20 with spiral-shaped tubes 21 and with radial flow of the primary fluid leads to a large section of passage for the primary fluid itself, with consequent possibility of limiting the velocity of the primary fluid even with the tubes positioned close together and a significant reduction in the volume of the steam generator (for example, indicatively half that of known helical-tube solutions).

The lower number of arrays of tubes to be traversed (in a radial direction) enables a drastic reduction of the pressure losses of the primary fluid (indicatively ten times less than those of known helical-tube solutions).

A better uniformity of radial velocity of the primary fluid between the inner part of the steam generator and the outer part can be obtained by varying the radial pitch between the spirals: larger in the inner part and smaller in the outer part.

There could be envisaged a self-adjustment system for stabilization of the flow of secondary water (device 70).

Both the construction and the assembly of tubes with spiral portions are much simpler and less costly than those of helical tubes.

The design of the pressurized tank 2 is simplified by resorting to a single nozzle 15 for each steam generator 11.

The vertical support of the steam generator 11 carried out at the level corresponding to that of the horizontal middle plane P of the nozzle 15 reduces the stresses on the mechanical coupling between the manifold body 50 and the nozzle 15.

The ensemble formed by the pump 10 and the steam generator 11 constitutes a compact assembly.

Each steam generator 11 can be extracted from the tank 2.

Finally, it is understood that numerous modifications and variations can be made to the reactor described and illustrated herein, without this implying any departure from the scope of the annexed claims.

The invention claimed is:

1. A pressurized-water-cooled nuclear reactor, comprising a pressurized tank, which houses a core, a hot header over the core, and a cold header surrounding the hot header and separated from the hot header by a separation structure and in which primary water constituting a core cooling fluid circulates; the reactor comprising at least one steam generator, extending along a vertical axis and positioned in the cold header and in which secondary water circulates for removing heat from the primary water; the steam generator comprising a plurality of heat-exchange tubes in which the secondary water circulates and which have respective substantially plane spiral portions set on top of one another in a number of levels to form a substantially annular tube bundle delimiting a substantially cylindrical central zone, which houses a supply duct in which the pressurized primary water coming from the hot header flows downwards; wherein each spiral portion is constituted by a plurality of substantially concentric turns set inside one another about the axis and which lie substantially in a common plane perpendicular to the axis; and wherein each tube comprises a delivery branch that connects a radially external end of the spiral portion to a water-delivery manifold, and a return branch that connects a radially internal end of the portion to a steam-return manifold; and wherein the delivery branches extend in a prevalently vertical direction substantially parallel to the axis, and are set circumferentially alongside one another and are radially external to the annular tube bundles; and the return branches extend in a prevalently vertical direction substantially parallel to the axis, and are set circumferentially alongside one another and radially inside the annular tube bundles; and wherein set within the tube bundle is a substantially cylindrical ferrule provided with first calibrated holes and delimiting inside the supply duct.

2. A reactor according to claim 1, wherein the steam generator extends along an axis, and the spiral portion of each tube is wound about the axis and is formed by a plurality of substantially concentric turns that lie in a common plane substantially perpendicular to the axis.

3. A reactor according to claim 2, wherein set on each level is the spiral portion of just one tube, or else set on each level are the spiral portions of two or more tubes, the turns of the different tubes of the level being inserted in one another in such a way that the n-th turn of one tube is followed by the n-th turn of the next tube and so forth.

4. A reactor according to claim 1, wherein the steam generator comprises a water-delivery manifold and a steam-return manifold, housed within the steam generator and connected to a water-inlet duct and to a steam-outlet duct respectively, the steam-outlet duct being set substantially coaxial inside the water-inlet duct.

5. A reactor according to claim 4, wherein the manifolds are hydraulically separated and set inside a single manifold body connected to a single nozzle formed on a wall of the pressurized tank.

6. A reactor according to claim 5, wherein the steam generator is supported vertically by the tank substantially at the height of a horizontal middle plane of the nozzle.

7. A reactor according to claim 5, wherein the manifold body is joined to the nozzle in a releasable way by a gripping element and gaskets, the gripping element being provided with adjustment elements for adjusting circumferentially the gripping force between the manifold body and the nozzle.

8. A reactor according to claim 5, wherein the manifold body has a tubular inlet portion adjacent and consecutive to a closed-bottom hollow terminal portion; a dismantleable tubular element being inserted in the tubular portion for defining an annular space that constitutes the water-delivery manifold; the steam-return manifold being made in the closed-bottom hollow terminal portion.

9. A reactor according to claim 4, wherein the manifolds are set in a central area of the steam generator, and the steam generator comprises two tube bundles set on top of one another on opposite sides of the manifolds.

10. A reactor according to claim 4, wherein the water-delivery manifold is provided with a pressure-loss regulation device for regulation of heat-exchange tubes inlet local pressure losses.

11. A reactor according to claim 10, wherein the pressure-loss regulation device comprises a pressure loss generator element, that is arranged inside the water-delivery manifold, is substantially cylindrical, and is provided with second small calibrated holes facing respective mouths of the heat-exchange tubes for determining a pre-set pressure loss located at inlet to each tube so as to stabilize boiling in the tubes in parallel.

12. A reactor according to claim 11, wherein an axisymmetrical mobile element is axially slidably arranged inside the pressure loss generator element, provided with third small calibrated holes facing the second calibrated holes of the pressure loss generator element and acting on which are pusher elements for varying the position of the mobile element with respect to the element between a position of alignment, in which the second holes are substantially aligned with the third holes, and a staggered position, in which the second holes are staggered with respect to the third holes.

13. A reactor according to claim 1, wherein the steam generator comprises a supporting structure releasably connected to the wall of the tank.

14. A reactor according to claim 13, wherein the supporting structure has pins inserted in respective seats formed on brackets that project radially from an internal surface of the pressurized tank.

15. A reactor according to claim 1, wherein the spiral portions are rigidly supported in a plurality of circumferential positions by respective supports radially and angularly spaced apart from one another.

16. A reactor according to claim 1, wherein the steam generator comprises an adjustable system for pre-compression of the tube bundle.

17. A reactor according to claim 16, wherein the adjustable pre-compression system is a mechanical system in which the spiral portions are packed tight and compressed by pre-tensioned elastic pusher elements acting on the spiral portions and/or on supports of the spiral portions for gripping the tube bundle axially.

18. A reactor according to claim 1, wherein a plurality of steam generators are set circumferentially alongside one another around the structure and intercept the entire flow of primary water flowing between the hot header and the cold header.

19. A reactor according to claim 18, wherein the steam generators are provided with respective perforated top plates for enabling inlet of the primary water inside the steam generators and which are set alongside one another to constitute a horizontal hydraulic separation structure, which is part of the separation structure between the hot header and the cold header.

20. A pressurized-water-cooled nuclear reactor, comprising a pressurized tank, which houses a core, a hot header over the core, and a cold header surrounding the hot header and separated from the hot header by a separation structure and in which primary water constituting a core cooling fluid circulates; the reactor comprising at least one compact steam generator, extending along a vertical axis and positioned in the cold header and in which secondary water circulates for removing heat from the primary water; the steam generator comprising a plurality of heat-exchange tubes in which the secondary water circulates and which have respective substantially plane spiral portions set on top of one another in a number of levels to form a substantially annular tube bundle delimiting a substantially cylindrical central zone, which houses a supply duct in which the pressurized primary water coming from the hot header flows downwards; wherein the spiral portions are rigidly supported in a plurality of circumferential positions by respective supports radially and angularly spaced apart from one another; wherein each spiral portion is constituted by a plurality of substantially concentric turns set inside one another about the axis and which lie substantially in a common plane perpendicular to the axis; and wherein set within the tube bundle is a substantially cylindrical ferrule provided with first calibrated holes and delimiting inside the supply duct.

21. A pressurized-water-cooled nuclear reactor, comprising a pressurized tank, which houses a core, a hot header over the core, and a cold header surrounding the hot header and separated from the hot header by a separation structure and in which primary water constituting a core cooling fluid circulates; the reactor comprising at least one compact steam generator, extending along a vertical axis and positioned in the cold header and in which secondary water circulates for removing heat from the primary water; the steam generator comprising a plurality of heat-exchange tubes in which the secondary water circulates and which have respective substantially plane spiral portions set on top of one another in a number of levels to form a substantially annular tube bundle delimiting a substantially cylindrical central zone, which houses a supply duct in which the pressurized primary water coming from the hot header flows downwards; wherein the steam generator comprises an adjustable system for pre-compression of the tube bundle; wherein each spiral portion is constituted by a plurality of substantially concentric turns set inside one another about the axis and which lie substantially in a common plane perpendicular to the axis; and wherein set within the tube bundle is a substantially cylindrical ferrule provided with first calibrated holes and delimiting inside the supply duct.

* * * * *

UNITED STATES PATENT AND TRADEMARK OFFICE
CERTIFICATE OF CORRECTION

Page 1 of 1

PATENT NO. : 9,091,486 B2
APPLICATION NO. : 12/674362
DATED : July 28, 2015
INVENTOR(S) : Luciano Cinotti It is certified that error appears in the above-identified patent and that said Letters Patent is hereby corrected as shown below:

Item (73)

ASSIGNEE:

Please add the following Assignee to the title page of the Letters Patent

LUCIANO CINOTTI (IT)

Signed and Sealed this
Nineteenth Day of July, 2016

Michelle K. Lee
*Director of the United States Patent and Trademark Office*